W. S. DU CHARME.
PIPE WRENCH.
APPLICATION FILED SEPT. 27, 1918.
1,293,734.
Patented Feb. 11, 1919.
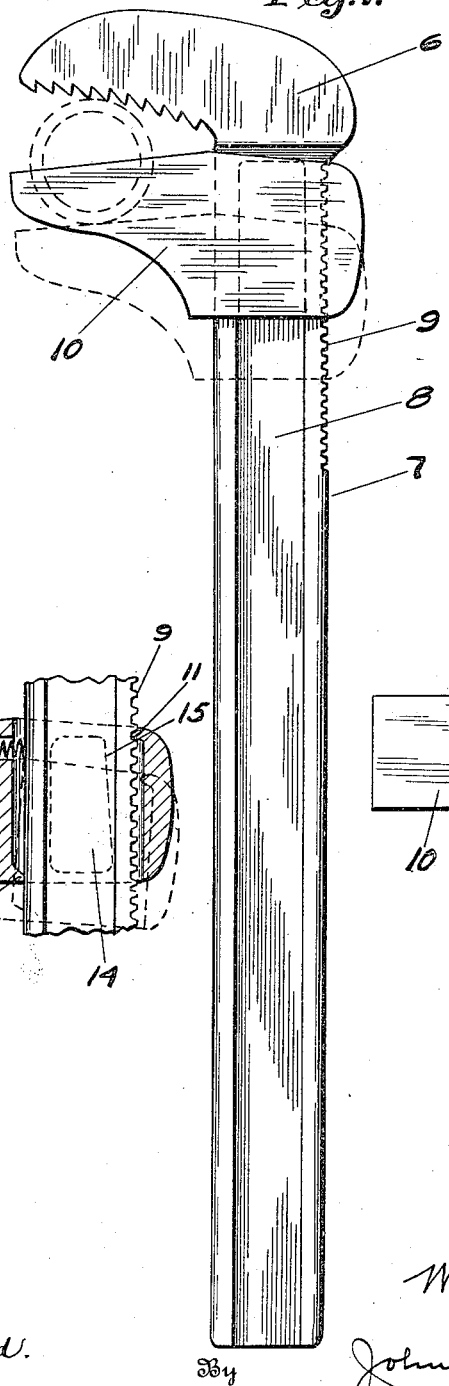
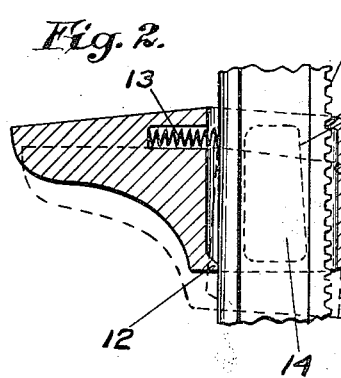
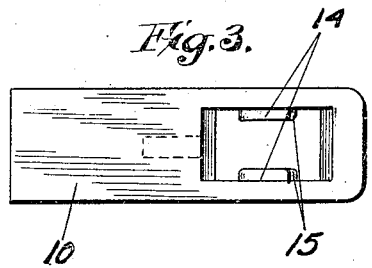
Witness
S. W. Brainard.
Inventor
W. S. Ducharme
By John A. Bernhardt
Attorney

UNITED STATES PATENT OFFICE.

WILLIAM S. DU CHARME, OF CLEVELAND, OHIO.

PIPE-WRENCH.

1,293,734.  Specification of Letters Patent.  Patented Feb. 11, 1919.

Application filed September 27, 1918. Serial No. 255,930.

*To all whom it may concern:*

Be it known that I, WILLIAM S. DU CHARME, a citizen of the United States, residing at Cleveland, in the county of Cuyahoga and State of Ohio, have invented certain new and useful Improvements in Pipe-Wrenches, of which the following is a specification.

This invention relates to pipe wrenches particularly designed for gripping pipes or other round work, and the object of the invention is to provide an improved wrench characterized by the fact that it comprises only two main parts, and that it can be easily adjusted to set the same for size.

The wrench comprises a shank having a rack on the edge thereof and an integral jaw, and a sliding jaw mounted upon the shank and adapted to engage the rack. The shank is channeled and the sliding jaw is provided with a pair of lugs which fit in the channels and which take the main part of the thrust or pressure of the wrench action when it is applied to the work.

In the accompanying drawings—

Figure 1 is a side elevation of the wrench.

Fig. 2 is a longitudinal section of the sliding jaw on the shank.

Fig. 3 is a plan of the sliding jaw removed from the shank.

In the drawings, 6 indicates an outer jaw integral with the shank 7 which has a channel 8 in each side extending lengthwise along the shank. The back edge of the shank has a rack 9. 10 is a sliding or adjustable jaw. It is slotted to fit over the shank and provided with a tooth 11 which may be engaged in any one of the notches of the rack 9 to adjust the jaw for the size of the work. It has also a tooth or a projection 12 which is adapted to bear against the front edge of the shank. A spring 13, set in a recess in the sliding jaw, acts to normally hold the tooth 11 in engagement with the rack at the place set. Each cheek of the sliding jaw is provided with a lug 14 projecting inwardly into the slot, in position to slide in the channel 8, and the size of these lugs is such that the front edges thereof will bear against the rear edge of the front channel flange, when pressure is applied to the wrench, so that the lugs relieve the tooth 11 of the pressure and so prevent the fracture of said tooth incident to the strain. The rear edges of the lugs 14 are beveled off toward the top, as indicated at 15, so that, when the jaw is adjusted, it may be tilted or lifted against the tension of the spring 13 to release the tooth 11 from the rack 9 and permit the jaw to be freely slid in or out on the shank.

The jaws are preferably V-shaped at their faces to take round work, but may be squared for flat work within the scope of the invention.

The additional sustaining means provided by the lugs 14 greatly increase the strength of the wrench and decrease the liability of breaking out the adjustable jaw where it is slotted for the shank.

I claim:

A wrench comprising a fixed jaw and channeled shank, the shank having a rack on the back edge thereof, and a sliding jaw on the shank having a tooth adapted to engage the rack and also having a lug fitting in the channel of the shank and adapted to contact with the flange thereof when pressure is applied, the sliding jaw having rocking movement on the shank to disengage the tooth from the rack, and the lug being inclined on one side edge to permit said rocking movement.

In testimony whereof, I do affix my signature in presence of two witnesses.

WILLIAM S. DU CHARME.

Witnesses:
JOHN A. BOMMHARDT,
G. W. ROSENBERG.

Copies of this patent may be obtained for five cents each, by addressing the "Commissioner of Patents, Washington, D. C."